United States Patent Office 3,219,692
Patented Nov. 23, 1965

3,219,692
METHOD FOR PREPARING PARA(HYDROXY-ALKOXY)BENZOIC ACIDS
Peter S. Petrie, Midland, Mich., assignor to The Dow Chemical Company, Midland, Mich., a corporation of Delaware
No Drawing. Filed Feb. 19, 1962, Ser. No. 174,237
4 Claims. (Cl. 260—521)

This application is a continuation-in-part of my co-pending application Serial No. 707,104, filed January 6, 1958, and now abandoned.

The present invention relates to p-(hydroxyalkoxy)benzoic acid and more particularly concerns a new and useful method of preparing the same.

It is an object of the present invention to provide a new and useful process for the production of the p-(hydroxyalkoxy)benzoic acids which gives improved yields of the desired product. It is another object of the present invention to provide a process which enables simple and inexpensive techniques in the separation of the desired product from the reaction mixture. These and other objects will become apparent to those skilled in the art from the following specification and claims.

It has now been found that p-(hydroxyalkoxy)benzoic acid can be prepared by reacting an alkylene oxide with an alkali metal salt of a p-hydroxybenzoic acid. The reaction proceeds readily at temperatures of from 75° to about 110° C. and at atmospheric or superatmospheric pressures. Good results are obtained when the alkylene oxide reactant is employed in excess and preferably when it is employed in amounts from 0.6 to 0.8 molar excess. In carrying out the reaction it is desirable to employ at least about a molar equivalent and often from 0.1 to 5.0 percent molar excess alkali based on the benzoic acid.

In carrying out the present invention an aqueous solution of an alkali metal salt of the p-hydroxybenzoic acid is prepared by mixing or otherwise blending the acid with an aqueous alkali metal hydroxide. The alkali metal hydroxide, such as potassium or sodium hydroxide, is used in about equimolar quantity to the acid, and is oftentimes employed in from between 0.1 to 5.0 percent molar excess. The reaction is preferably carried out in a stepwise manner with stirring and heating to between 75° to 110° C. Upon completion of the conversion of the p-hydroxybenzoic acid to the corresponding alkali metal salt, alkylene oxide is added thereto in a portion-wise manner with stirring and heating as before. The stirring and heating are continued for a period of time after the addition of the alkylene oxide to complete the reaction. Thereafter the reaction vessel and contents are diluted with water and cooled to below room temperature at which temperature at least an equivalent proportion of an acid is added to neutralize the sodium salt and precipitate the free acid. The desired product, the free acid, can be recovered in any convenient conventional manner such as filtration, decantation or solvent extraction and/or recrystallization from any appropriate organic solvent.

The following examples illustrate the present invention but are not to be construed as limiting.

*Example 1.—Para(2-hydroxyethoxy)benzoic acid*

Fifteen pounds (0.109 lb. mole) of p-hydroxybenzoic acid was stirred into a solution of 7.2 lbs. (0.109 lb. mole) of 85 percent potassium hydroxide in 13 lbs. of water in a ten gallon iron kettle. The solution was heated with stirring to 90–95° C. and 7.75 lbs. (0.176 lb. mole) of ethylene oxide was added over a 5 hour period. Stirring was continued for another half hour. The reaction product was then diluted with 28 gallons of water, cooled to 10° C., stirred, and acidified wtih 6 lbs. (0.117 equivalent) of concentrated sulfuric acid. As a result of these operations there was obtained a crude free p-(2-hydroxyethoxy)benzoic acid product as a fine crystal. The crude product was separated by centrifuging and purified by recrystallizing from a mixture of 5 gallons of isipropanol–10 gallons of water. There were obtained 18.1 lbs. (0.10 lb. mole) of p-(2-hydroxyethoxy)benzoic acid of 98.8 percent purity. The yield was 91 percent based on the p-hydroxybenzoic acid.

*Example 2.—Para(2-hydroxypropoxy)benzoic acid*

Three hundred forty-five grams (2.5 moles) of p-hydroxybenzoic acid were stirred into a solution of 165 grams (2.5 moles) of 85 percent potassium hydroxide in 350 grams of water. The mixture was stirred at 90–90° C. and 232 grams (4.0 moles) of propylene oxide were added in 3.5 hours. Stirring was continued for half an hour longer. The reaction product was then diluted with water, cooled to 5° C. and acidified with 3 moles of hydrochloric acid to precipitate free p-(2-hydroxypropoxy)benzoic acid. The slurry was filtered and the crude product was purified by recrystallizing from water. There was obtained 441 grams (2.25 moles) of p-(2-hydroxypropoxy)benzoic acid of 98.5 percent purity. The yield, based on the p-hydroxybenzoic acid was 90 percent.

*Example 3.—Para(2-hydroxybutoxy)benzoic acid*

Three hundred forty-five grams (2.5 moles) of p-hydroxybenzoic acid were stirred into a solution of 165 grams (2.5 moles) of 85 percent potassium hydroxide in 350 grams of water. The solution was stirred at 90–95° C. and 324 grams (4.5 moles) of butylene oxide (90 percent 1,2-isomer; 10 percent 2,3-isomer) were added in 5.5 hours. Stirring was continued for half an hour longer. The reaction mixture was diluted with water, cooled to 10° C. and acidified with 3 moles of concentrated hydrochloride acid to precipitate the free p-(2-hydroxybutoxy)benzoic acid. The slurry was filtered and the crude product was recrystallized from water. There were obtained 353 grams of p-(2-hydroxybutoxy)benzoic acid of 96 percent purity. The yield was 83 percent, based on the p-hydroxybenzoic acid.

*Example 4.—Para(2hydroxy-1-methylpropoxy) benzoic acid*

In the manner of Example 3 employing isobutylene oxide in place of butylene oxide the 4-(2-hydroxy-1-methylpropoxy)benzoic acid can be prepared.

It is to be understood that any alkylene oxide, aromatic alkylene oxide, such as styrene oxide, or cyclic alkene oxide, such as cyclohexene oxide, may be employed in accordance with the present invention to prepare, for example, the corresponding p-($\beta$-hydroxyalkoxy)benzoic acid, ($\beta$-hydroxy-$\beta$-phenylethoxy)benzoic acid or p-(2-hydroxycyclohexyloxy)benzoic acid.

*Example 5*

The following example was run to illustrate the results obtained when the oxide was employed in equimolar proportions with the hydroxybenzoic acid.

A 165 grams of 85 percent KOH flakes (2.5 moles) was dissolved in 300 cc. of water to which was added 345 g. (2.5 moles) of p-hydroxybenzoic acid. Ethylene oxide (113 g., 2.57 moles) was added to the solution over a 1.5 hour period with stirring. During the addition and for 1 hour subsequent the temperature of the solution was held at about 90° C. Thereafter the reaction mixture was cooled, poured into ice and water with stirring and 250 cc. of HCl (about 3 moles HCl) was added to precipitate the product and unreacted starting material. The resulting slurry was filtered; the filter cake dissolved in about 8 l. of deionized water at 90° C. A small proportion of 18 g. remained undissolved so the hot solution was filtered. The residue analyzed 57.5 percent by weight p-hydroxybenzoic acid. The hot filtrate was cooled to 7° C. and filtered. The filter cake was dried, weighed, and analyzed.

As a result of these operations there was obtained 211 grams of product, a yield of only 43.2 percent analyzing 93.2 percent p-(2-hydroxyethoxy)benzoic acid and 3 percent p-hydroxybenzoic acid. The product melted at 164–168° C. The filtrate contained 0.43 moles (59 g.) of p-hydroxybenzoic acid.

*Example 6*

In a like manner to Example 5 a run was made using 4.3 moles of oxide in place of 2.57 moles, all other conditions, feeds, etc. being the same. As a result of this operation there was obtained an 87.7 percent yield of 98.3 percent pure p-(2-hydroxyethoxy)benzoic acid having a melting point of 177°–180° C. Thus, contrary to the expected addition of more than one equivalent of alkylene oxide there was obtained, using excess oxide, a greater yield of purer product than when using only about equimolar quantities.

I claim:

1. A process which comprises reacting p-hydroxybenzoic acid, at least about a molar equivalent of an alkali metal hydroxide and alkylene oxide in an amount at least 0.6 to 0.8 molar excess of said acid reactant at a temperature of about from 75° to 110° C., acidifying the reaction product and recovering a p-(hydroxyalkoxy) benzoic acid product.

2. The process of claim 1 wherein the temperature is between about 90° and 100° C.

3. A process for the preparation of p-(hydroxyalkoxy) benzoic acids which comprises reacting p-hydroxybenzoic acid with from 0.1 to 5.0 percent molar excess of an alkali metal hydroxide and from 0.6 to 0.8 molar excess of an alkylene oxide in the presence of water and at a temperature of from about 75° to 110° C.; acidifying the reaction mixture with at least a molar equivalent of an acid; and, recovering the appropriate hydroxyalkoxy benzoic acid.

4. A process which comprises reacting p-hydroxybenzoic acid, at least about one molar equivalent of an alkali metal hydroxide and ethylene oxide in an amount at least 0.6 to 0.8 molar excess of said acid reactant at a temperature of about from 75° to 110° C., acidifying the reaction product and recovering a p-(2-hydroxyethoxy) benzoic acid product.

References Cited by the Examiner

UNITED STATES PATENTS 2,686,198   8/1954   Bock _____ 260—521 X
2,696,498  12/1954   Hoch et al. _____ 260—521

LORRAINE A. WEINBERGER, *Primary Examiner.*

CHARLES B. PARKER, LEON ZITVER, *Examiners.*